E. G. KNOEPFEL.
APPARATUS FOR TREATING GASES AND SEPARATING SMOKE AND DUST THEREFROM.
APPLICATION FILED FEB. 24, 1908.
943,422.
Patented Dec. 14, 1909.
5 SHEETS—SHEET 1.
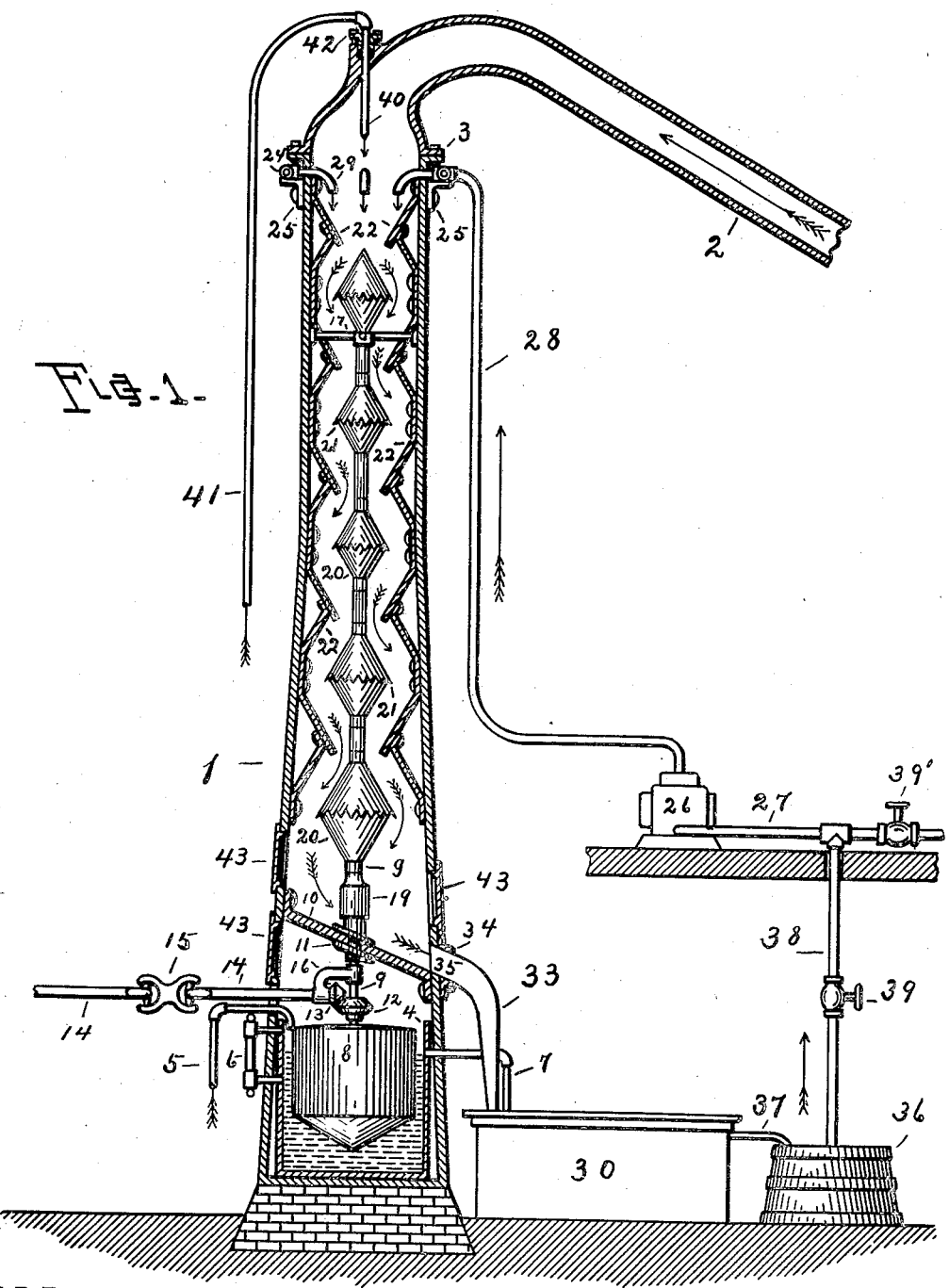

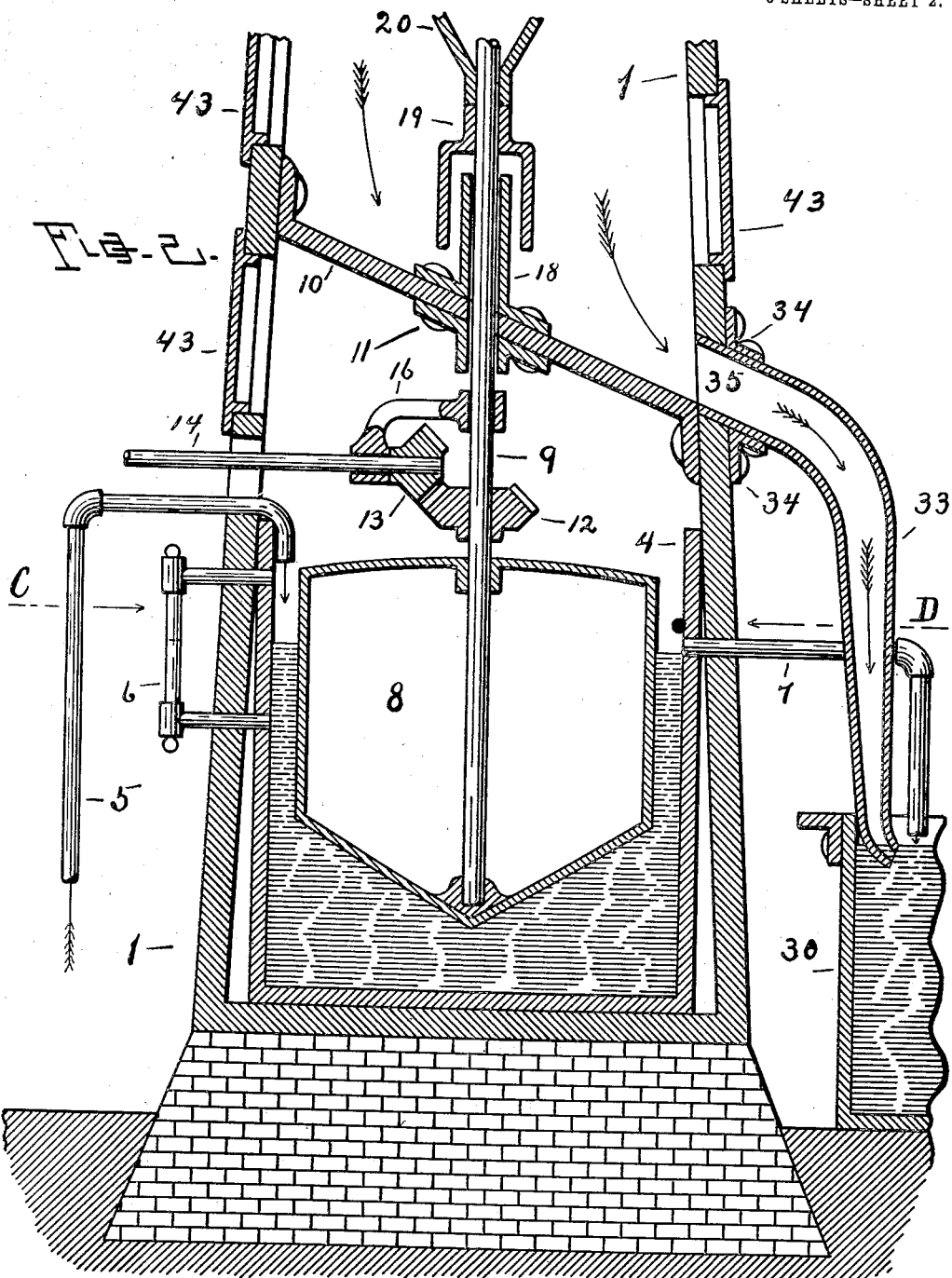

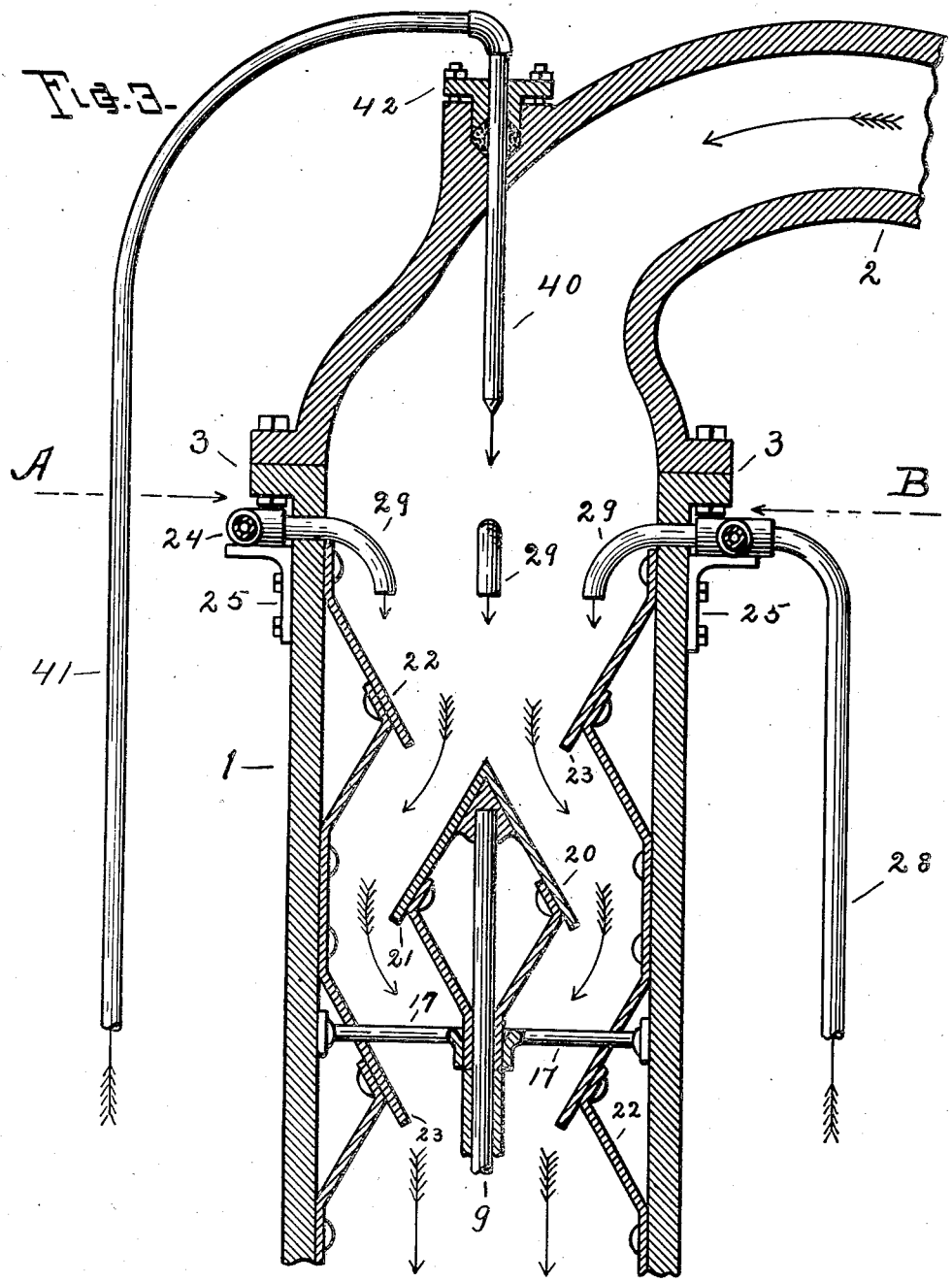

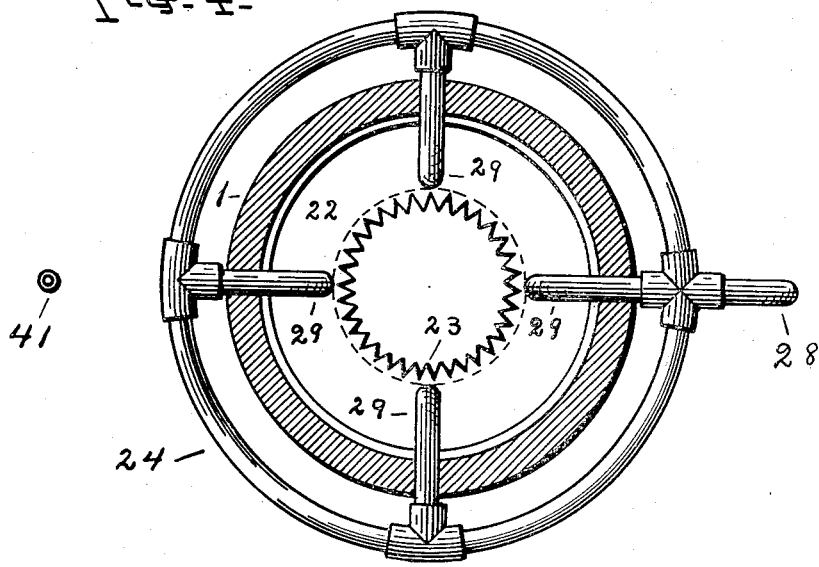
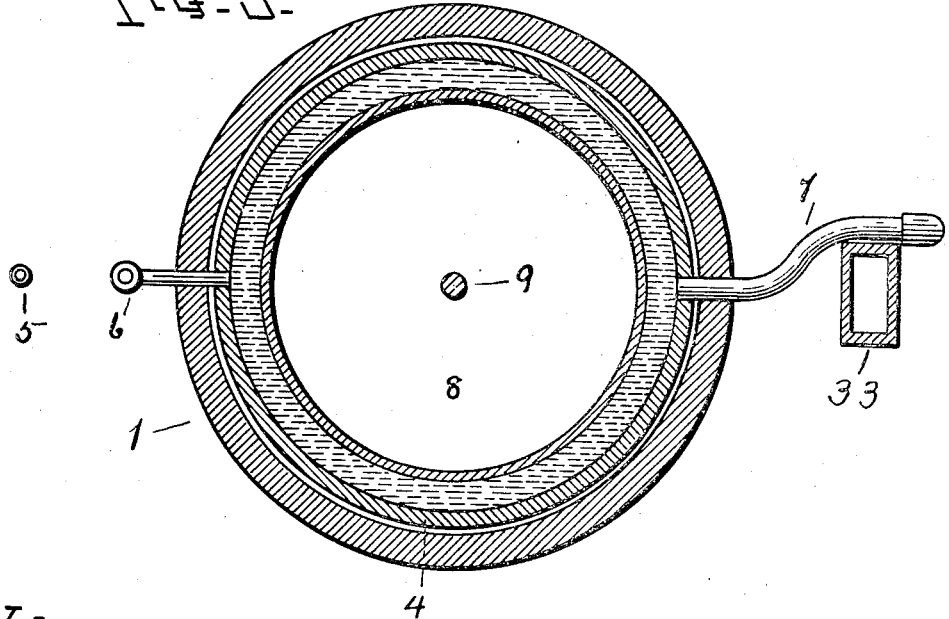

E. G. KNOEPFEL.
APPARATUS FOR TREATING GASES AND SEPARATING SMOKE AND DUST THEREFROM.
APPLICATION FILED FEB. 24, 1908.
943,422.
Patented Dec. 14, 1909.
5 SHEETS—SHEET 5.
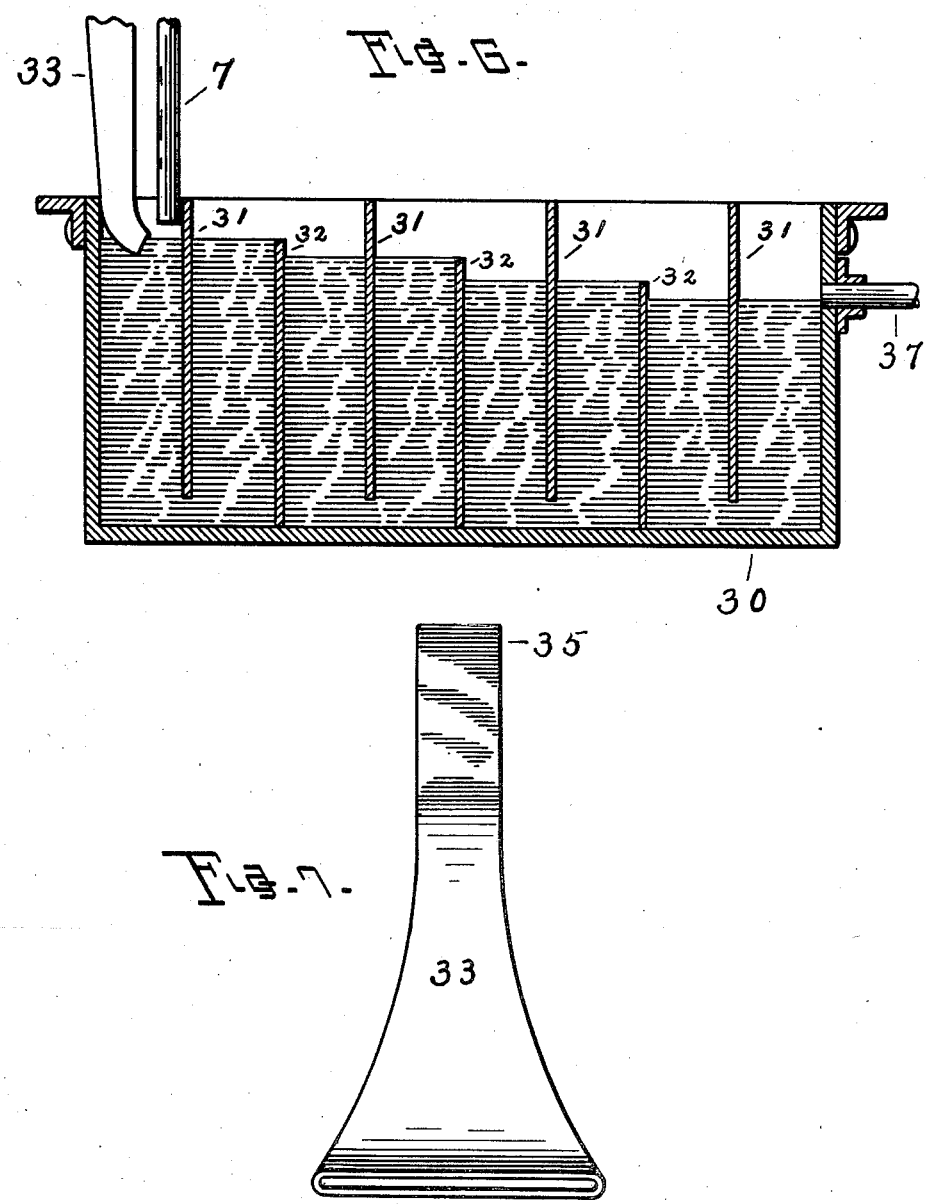

UNITED STATES PATENT OFFICE.

ERNEST GUSTAVE KNOEPFEL, OF SAN FRANCISCO, CALIFORNIA.

APPARATUS FOR TREATING GASES AND SEPARATING SMOKE AND DUST THEREFROM.

943,422.

Specification of Letters Patent.     Patented Dec. 14, 1909.

Application filed February 24, 1908. Serial No. 417,334.

*To all whom it may concern:*

Be it known that I, ERNEST GUSTAVE KNOEPFEL, of San Francisco, California, have invented new and useful Improvements in Apparatus for Treating Gases and Separating Smoke and Dust Therefrom, whereof the following is a specification.

My invention is intended to be applied more particularly to smelting and refining furnaces, for the purpose of saving valuable products which may be contained in the gases emanating therefrom, and also to render such gases innocuous.

In carrying the invention into effect I provide a tower, closed at both top and bottom, and divide the interior of the tower into two chambers, separated by an inclined partition. The lower chamber is comparatively low, being only high enough to constitute or receive a reservoir, whose purpose is to contain water to float a support for a vertical shaft and cones, presently to be mentioned. The upper chamber, which occupies nearly the entire height of the tower, is thus closed at both top and bottom, and constitutes a closed purifying chamber. The gases to be treated are delivered to this chamber at the top thereof, where a steam jet, or other means of inducing a draft, causes them to draw downward to the bottom thereof. Water, or other liquid, for treating the gases, is also supplied to the chamber at the top thereof, and passes down with the gases to the bottom of the chamber, whence both liquid and gaseous remnants of the treatment are discharged. To foster the commingling of the liquid and gases, I arrange within the chamber a rotating shaft carrying a series of cones, and alternating with the cones I provide a series of baffle plates in the form of funnels attached to the walls of the chamber. The cones thus direct the downward passing contents of the chamber onto the baffle plates, and the latter direct them back onto the cones. The lower edges of both cones and baffle plates are serrated, so that the liquid passing over them is broken up into fine streams, or drops. The rotation of the cones facilitates the action by scattering said streams or drops in more or less of a spray. The liquid thus has a chance to wash from the gases all solid matters entrained in them, and to dissolve therefrom all soluble constituents. Arriving at the bottom of the chamber, the matters, both liquid and gaseous, are directed by the inclined partition, already mentioned, to a discharge spout, which conveys them into a settling tank. This tank is divided into compartments of successively less height, and in each compartment is a mutilated partition, reaching not quite to the bottom thereof. Hence the liquid passing through the settling tank passes first down to the bottom thereof, and then up over the top into the next compartment, and down to the bottom of that one and then up over its edge, and so on, to the final overflow. In this course the undissolved gases are gradually discharged into the atmosphere, and the liquid overflows into a receiving tank, from which it may be returned to the top of the purifying chamber, or removed for the extraction from it or its contained matters. The spout which conducts from the chamber to the settling tank is reduced or straitened toward its mouth and at the same time flattened, so that the exuding matters are delivered to the tank in a thin and approximately continuous sheet.

In the accompanying five sheets of drawings I have illustrated my invention in what I consider its best form, Figure 1 being on a smaller scale than the other figures.

In the drawings:—Fig. 1 is an elevation of the apparatus, the tower being in section. Fig. 2 is a sectional elevation, showing the lower part of the tower, and a portion of the settling tank. Fig. 3 is a sectional elevation, showing the upper part of the tower. Fig. 4 is a cross section taken at the line A, B, of Fig. 3. Fig. 5 is a cross section taken at the line C, D, of Fig. 2. Fig. 6 is a sectional elevation of the settling tank. Fig. 7 is a front elevation of the straitened and flattened spout through which matters pass from the purifying chamber into the settling tank.

In these figures:—1 is the tower.

2 is the furnace flue leading into the top of the tower.

3 is the joint at the top of the tower.

4 is the tank in the bottom of the tower.

5 is a pipe for supplying water to the tank.

6 is a gage glass to the tank.

7 is an overflow pipe for the tank.

8 is a float in the tank.

9 is a vertical shaft supported by the float.

10 is an inclined partition dividing the tower into an upper and lower chamber.

11 is a bearing in the partition for shaft 9.

12 is a gear on shaft 9.

13 is a pinion meshing with gear 12 for rotating the same.

14 is the pinion shaft. 15 is a universal joint therein.

16 are bearing brackets connecting shafts 9 and 14.

17 is a bearing for the upper end of shaft 9.

18 is a sleeve on partition 10, surrounding shaft 9.

19 is a petticoat connected to shaft 9 and overhanging the sleeve 18.

20 are cones on shaft 9.

21 are the denticulate lower edges of the cones.

22 are baffle plates attached to the inner walls of the tower and alternating with cones 20.

23 are the serrated lower edges of the baffle plates.

24 is a water main surrounding the tower near its top.

25 are brackets for the support of main 24.

26 is a pump for supplying water to main 24.

27 is the suction pipe of pump 26.

28 is the discharge pipe connecting the pump with main 24.

29 are nozzles on main 24, for discharging into the tower.

30 is a settling tank.

31 are the mutilated partitions in the tank 30.

32 are the dividing partitions in tank 30.

33 is a spout from the upper chamber of the tower into tank 30.

34 are brackets to support the spout.

35 is the opening into the spout.

36 is the receiving tank.

37 is the overflow pipe from settling tank 30 into tank 36.

38 is a pipe from receiving tank 36 to the pump suction.

39 and 39' are valves controlling the suction of pump 26.

40 is a jet in the top of the tower for causing a draft.

41 is a pipe connecting with jet nozzle 40.

42 is a stuffing box around the jet nozzle.

43 are man holes.

In this apparatus, illustrated in the drawings, the gases to be treated, coming from the furnace through the flue 2, enter the closed top of the tower, and are there given a downward direction, partly by their own momentum, but largely by the jet issuing from the nozzle 40. At the same time water, or other liquid, for treating the gases, is discharged into the top of the tower through the nozzles 29, by which it also is directed downward. This liquid, falling upon the upper baffle plate, flows down over its surface, and trickles off the points of its serrated lower edge onto the upper cone 20, passes down over the surface of the cone, and trickles off the points of its serrated or denticulated lower edge, in which it is assisted by the revolution of the cone, onto the next baffle plate, and so on to the bottom of the upper chamber of the tower, where it falls upon the inclined partition 10, and flows down that into and through spout 33 into settling tank 30. In their passage through the tower, the water and gases are pretty thoroughly commingled, and the solid and soluble matters are absorbed by the water. The spout 33, being both straitened and flattened toward its mouth, delivers the mixed gas and liquid into the tank 30, in a thin, broad, stream, and there it passes down under the first mutilated partition 31, and up over the first dividing partition 32, and so on to the overflow 37. By the time the overflow is reached the noncondensable gases will have escaped into the atmosphere in an innocuous condition. The remaining liquid, with its dissolved matters, and entrained solids, passes through overflow 37 into receiving tank 36, whence, if not too rich, it may be raised to the top of the tower, and used again, by a simple manipulation of valves 39 and 39', or it may be removed for other treatment and fresh liquid supplied to the tower. By the simple expedient of making the cones successively larger as the bottom of the tower is approached, I provide for any increase in the bulk of the liquid due to its absorption of gaseous and solid matters.

Supporting the vertical shaft on a float in a body of water provides a frictionless bearing which is free from deleterious corrosive influences, and also, by varying the height of the water, enables me to adjust the position of the cones with reference to the baffle plates, to a limited extent.

The inclined partition 10 divides the interior of the tower into two chambers, both of which are closed, and no objectionable matters can escape except by the outlets provided for the purpose. The man holes 43 provide for access to the interior of the tower when desirable. The spout 33, being both straitened and flattened, delivers the gases in a thin continuous stream to the liquid in the settling tank 30, whereby the gases are much more effectively commingled with that liquid than they would be if in clots, and consequently maintain a longer contact with it before they escape into the atmosphere.

I claim:—

1. In combination, a chamber adapted to receive gases and washing fluid at the top and discharge them at the bottom, a series of central cones and baffle plates between them, said cones discharging the liquid passing over them onto the baffle plates and the baffle plates discharging onto the next succeeding cones, and means for rotating the cones.

2. In combination, a chamber, means for supplying gases and liquid to said chamber at the top thereof, means for discharging said chamber at its bottom, a series of central cones and funnel shaped baffle plates between them in said chamber, said cones and baffle plates having serrated lower edges.

3. In combination, a chamber, means for supplying gases and liquid to said chamber at the top thereof, means for discharging said chamber at the bottom, a series of central cones and funnel shaped baffle plates between them in said chamber, said cones and baffle plates having serrated lower edges, and means for rotating said cones.

4. In combination, a chamber, means for supplying gases and liquid to said chamber at its top, means for inducing a downward draft of the gases in said chamber, means for discharging said chamber at its bottom, and a settling tank connected with said discharge, said settling tank divided into compartments by partitions of successively lower height, each compartment having a mutilated partition reaching short of the bottom thereof.

5. In combination, a tower shaped chamber adapted to receive gases and washing fluid at its top and discharge them at its bottom, an upright shaft therein, a series of central cones mounted on said shaft in said chamber, a reservoir containing liquid at the bottom of said chamber, a float floating in said liquid, and means for rotating said shaft, said shaft supported by said float.

6. In combination, a tower shaped chamber adapted to receive gases and washing fluid at its top and discharge them at its bottom, an upright shaft therein, a series of central cones mounted on said shaft in said chamber, a reservoir containing liquid at the bottom of said chamber, a float floating in said liquid and supporting said shaft, mechanism for rotating said shaft, and means for controlling the level of the liquid in said reservoir.

7. In combination, a tower shaped chamber adapted to receive gases and washing fluid at its top and discharge them at its bottom, a straitened and flattened spout through which such discharge is effected, and a settling tank into which such discharge is effected.

In testimony whereof, I have hereunto signed my name in the presence of two witnesses this 10th day of February, 1908.

ERNEST GUSTAVE KNOEPFEL.

Witnesses:
MAURICE J. ZIMELLI,
A. E. SCOTT.